United States Patent [19]

Takahashi et al.

[11] 3,842,195

[45] Oct. 15, 1974

[54] MULTI-COLOR RECORDING METHOD AND APPARATUS THEREFOR

[75] Inventors: Tsunehiko Takahashi; Akira Nabara, both of Asakashi, Japan

[73] Assignee: Fuji Photo Film Co., Ltd., Kanagawa, Japan

[22] Filed: Dec. 4, 1972

[21] Appl. No.: 311,598

[30] Foreign Application Priority Data

Dec. 3, 1971 Japan .............................. 46-97727

[52] U.S. Cl...............358/75, 340/173 CC, 346/46, 346/76 L, 346/108

[51] Int. Cl. .............................................. H04n 1/46

[58] Field of Search ...... 178/5.4 CD, 6.6 R, 6.6 TP, 178/6.7 R, 5.2 R; 346/46, 76 L, 108; 340/173 CC

[56] References Cited

UNITED STATES PATENTS

| | | | |
|---|---|---|---|
| 2,951,116 | 8/1960 | Sites | 178/5.4 CD |
| 3,181,170 | 4/1965 | Akin | 346/108 |
| 3,351,948 | 11/1967 | Bonn | 346/76 L |
| 3,651,488 | 3/1972 | Amodei | 340/173 CC |
| 3,679,818 | 7/1972 | Courtney-Pratt | 178/5.4 CD |

*Primary Examiner*—Howard W. Britton
*Attorney, Agent, or Firm*—Sughrue, Rothwell, Mion, Zinn & Macpeak

[57] ABSTRACT

In a method of recording multicolor images from an original, an amplitude modulated laser modulated by a color signal from an original is irradiated onto a photosensitive material which yields different colors according to the intensity of light irradiated thereon.

Apparatus for recording in this manner comprises an original reading means which yields a signal which varies in accordance with the colors of the original, a laser source emitting a light beam of a single wavelength, a signal converter means which converts the signal from the original reading means to a signal representing the color of the original, and a light amplitude modulator means which modulates the laser beam according to the signal supplied from the signal converter means.

6 Claims, 5 Drawing Figures

PATENTED OCT 15 1974

3,842,195

MULTI-COLOR RECORDING METHOD AND APPARATUS THEREFOR

BACKGROUND OF THE INVENTION

1. Field of the Invention

This invention relates to a method of and apparatus for recording color images, more particularly to a method of and apparatus for record-ing multicolored line images such as letters, numerals, marks, line patterns and the like without losing color information.

2. Description of the Prior Art

It is known that a recording method using a laser beam is well suited for scanning recording as described in Image Technology (pages 16 to 24, Aug. and Sept. 1969) by B. J. Tompson. By utilizing a highly concentrated laser beam, photo-energy can be concentrated in a small area, and accordingly it is possible to record at high speed and high density. Further, it is possible to record on a photosensitive material using a laser beam to obtain a material which can be easily developed and fixed.

There are economical and technical problems, however, in recording by the use of a laser beam in multicolor recording. In order to make a multicolored record of a multicolored original, it is necessary to use a very costly krypton laser (a white laser) or to use a plurality of laser generators of different wavelengths, pass the laser beams of different wavelengths through light modulators and then direct the modulated laser beams in a common light transmission path.

On investigating the content of general documents, including drawings, it was found that there were many more documents from which multicolor information was desired rather than documents from which half-tone information was desired. Therefore, a greater need exists for a method of recording multicolor images than for recording black and white images with half-tone portions.

SUMMARY OF THE INVENTION

The primary object of the present invention is to provide a method of recording multicolor images suitable for making a record of line images.

Another object of the present invention is to provide a method of recording multicolor images at high speed.

Still another object of the present invention is to provide a method of recording multicolor images wherein photosensitive materials of low cost can be used.

A further object of the present invention is to provide a method of recording multicolor images wherein photosensitive materials of low sensitivity can be used as the recording material.

A still further object of the present invention is to provide a method of recording multicolor images wherein the original and the recording can be located at separated locations.

A still further object of the present invention is to provide a method of recording multicolor images wherein the recording section can be linked to a plurality of original reading sections.

In order to accomplish the above objects, in accordance with the present invention, an amplitude modulated laser beam, modulated by color signals, is irradiated onto a photosensitive material which presents different colors according to the intensity of light irradiated thereon.

A still further object of the present invention is to provide an apparatus for carrying out the method as described above.

In order to accomplish this object, multicolor recording apparatus in accordance with the present invention comprises an original reading means including a multicolor light source and a plurality of photodetectors sensitive to different wavelengths or a combination of a plurality of color filters and photodetectors, a laser source emitting a light beam of a single wavelength, a signal converter which converts the signal from the original reading means to a signal representing the color of the original, and a light amplitude modulator for modulating the laser beam according to the signal supplied from the signal converter and recording on a photosensitive material which will yield different colors in response to the intensity of the laser beam irradiated thereon.

DETAILED DESCRIPTION OF THE INVENTION

Figures 1, 2:
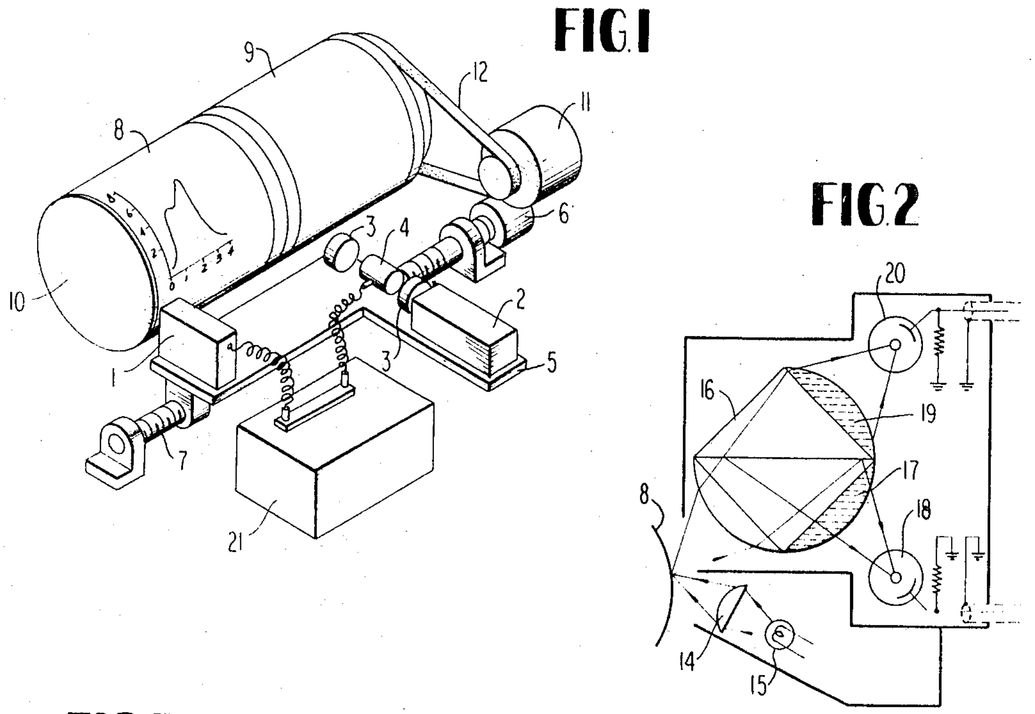
FIGS. 1, 2 and 5 are views of apparatus used in the present invention.

The term "photosensitive material which yields different colors in response to the intensity of laser light irradiated thereon" as is used in the present specification and claims includes, for example, a photosensitive material which yields a color A when a monochromic light beam irradiated thereon has an intensity close to its upper limit, a color B when the monochromic light beam has an intermediate intensity and a color C when the monochromic light beam has an intensity close to its lower limit. Some specific examples thereof will be later described.

The term "laser source emitting a light beam of a single wavelength" as is used in the present specification and claims does not mean a laser source which is able to emit a single wavelength laser beam with the accuracy required in a holographic recording or in gigahertz band photocommunication, but broadly includes any kind of laser beam emitter such as an argon ion laser or a helium-selenium laser which is capable of simultaneously emitting a plurality of wavelengths close to each other to such an extent that no color dispersion problem with the light amplitude modulators takes place, a semiconductor laser or a dye laser having a relatively wide range of emission, helium-neon lasers including a number of longitudinal modes (see, e.g., the text edited by Albert K. Levine, "LASERS," page 64; volume 1, ) or ion lasers with a monochromatic light beam oscillator.

Further, it is also possible to carry out the method of the present invention using a filter grating, or prism at the output portion of the laser source, although this is not desirable in view of the energy loss due to the filter grating or the prism. However, since the energy lost can be utilized in the present invention in a manner as described, such laser sources can be used in the present invention.

It will therefore be understood that a laser source emitting a light beam of a single wavelength as this term is used in the present specification and claims means any kind of source which can emit a laser beam having a monochromic property sufficient to cause no significant problem of color dispersion upon photo-modulation and which is capable of supplying a sufficient amount of photoenergy for recording.

Color dispersion by the photo-modulator or light modulator is caused by the fact that the modulating characteristics depend on the wavelength in an electro-optical or acoustic optical light modulator. Color dispersion is produced by a difference in the refraction coefficient or electroptical constant of a material. For instance, for KDP (heavy hydrogen substituted) a wavelength shift of 3,000 A requires a two fold voltage increase for a half wave retardation (100 percent modulation). Since a constant voltage application is used in the present invention, light having a wavelength 1,000 A different from a predetermined value cannot be used. For example, when two light beams of substantially the same intensity and of a 1,000 A different wavelength are transmitted through a single light modulator in the same optical path, the modulation effect of the composite light bundle is extremely small, and the present invention cannot be carried out.

Some specific examples of lasers useful in the present invention are given below:

a. A He-Cd laser which emits light of wavelengths of $0.3\mu$ and of $0.44\mu$. Either wavelength can be used.

b. An He-Se laser, He-Mg laser or $Kr^+$ laser which emits light of various wavelengths at the same time. Light of one wavelength which is separated by a prism may be used in the present invention, or a wave selector (prism or diffraction grating) may be built in the laser to give monochromatic light.

c. $Ar^+$ lasers as are commercially available which emit light of wavelengths $0.515\mu$, $0.502\mu$, $0.497\mu$, $0.488\mu$, $0.477\mu$, $0.473\mu$, $0.466\mu$ and $0.458\mu$.

The light except that at $0.515\mu$ and $0.488\mu$ is weak and cannot be used, but since the light at $0.515\mu$ and $0.488\mu$ is close in wavelength, such lasers can be used. However, since the dispersion effect is encountered and modulation will be lowered, it is preferred to use only one wavelength and filter the other.

d. He-Ne lasers emitting light at about $0.633\mu$, $1\mu$ and $3\mu$. The most popular of such lasers emits light only at $0.633\mu$ and this can be used.

e. YAG lasers, which emit light at $1.06\mu$.

Examples of useful semiconductor lasers include $Al_x Ga_{1-x} As$, $Ga As_{1-x}$ and GaSb lasers, where the wavelength is varied by varying X.

An example of a useful dye laser is one based on Rhodamine 6G (see, e.g., Applied Optic, Vol. 9, No. 12, 1970, pages 2742 to 2745.).

It will thus be apparent to one skilled in the art that the term "light beam of a single wavelength" essentially includes laser beams which may vary in wavelength so long as color dispersion does not occur to such an extent that modulation is impossible. Usually, the greater the difference in wavelength, the greater the color dispersion, and at some point unacceptable results will be encountered, but this point will obviously vary from user to user. Most preferably, monochromatic light is used.

The term "signal or color representing the color of the original" as is used in the present specification and claims does not necessarily means a faithful color reproduction as is made in ordinary color photography, but means a record of the multicolor original produced without losing the multicolor information carried thereon, but wherein the respective color phase or hue might be changed. For instance, red and blue in the original may be recorded as green and black, respectively, in accordance with this invention.

The term "signal converter" as is used in the present specification and claims means a device for receiving electric signals from a plurality of photodetectors and comparing the signals with predetermined thresholds to change them into binary codes and to convert the electric signals obtained in the form of the plurality of digital signal bits into analog signals to drive the light amplitude modulator. Devices and circuitry to accomplish such a function are well known in the art, e.g., a gate controlled weighted resistor laddor network where a digital signal will open a gate to apply a predetermined voltage across a load resistor $R_L$ and the load on $R_L$ is in correlation to the number of pulses.

The term "light amplitude modulator" as is used in the present specification and claims includes any type of modulator which is capable of changing the intensity of the laser beam according to the amplitude of an electric signal or magnetic signal impressed thereon. The light modulating means used with best effect in the present invention is an electro-optical light modulator utilizing the electroptic Pockels effect or the electroptic Kerr effect which is able to provide as many as one hundred intermediate tone steps when combined with a polarizer to conduct light amplitude modulation. (See, e.g., U.S. Pat. No. 3,429,636 and U.S. Pat. No. 3,506,929). Such a property of the light amplitude modulator is utilized in this invention to obtain a light beam varying in intensity in response to a color signal impressed thereon.

The term "photodetectors of different wavelength sensitivity" will be self-defining to one skilled in the art. Examples of preferred photodetectors are silicon phototransistors which have high sensitivity at about 8,000 A and single crystal CdS photoconductors (see, e.g., Oyo Butsuri by Itsuki Ban et al. Japan Society of Applied Physics, Vol. 32, No. 2, 1963, pages 109–113) which have high sensitivity at about 5,000 A. The CdS photoconductor detects green-yellow and the silicon phototransistors yellow to red yellow.

In accordance with the present invention, the advantages inherent in using a laser beam can be enjoyed since a laser beam is used for recording. Accordingly, it is possible to use a photosensitive material of low sensitivity as the recording material, especially when the recording is performed in a reduced scale. Further, since ordinary monochromic laser scanning recording apparatus can be utilized in the present invention, particularly in the recording portion thereof, the present invention can easily be practiced.

Above all, in accordance with the present invention, the value of the record and the available duplication range of the record is greatly enhanced due to the multicolor capability of the record.

Further, it is possible to practice the present invention in the form of long distance image transmission or microfilm transmission utlizing the features of the laser recording method. In other words, the original reading portion and the recording portion can be connected through wireless or wire communication means, and accordingly, both portions can be separated by a great distance, and a number of reading means can be connected with a single recording means.

In addition, since the laser beam can be concentrated to the limit of the optical diffraction, (see, e.g., Fundamentals of Optics, Jenkins and White, McGraw-Hill, New York, New York — this term is also known as Rayleigh's criterion), this recording method can be used for microphotographic recording, wherein a low sensitivity film can be used and comparatively high speed recording is possible. While in ordinary microphotographic recording using color films the preservation capability or storage stability of the film is a problem, in the present invention a photosensitive material of high storage stability can be used, i.e., one which is relatively insensitive to atmospheric conditions. In microphotographic transmission, the merits inherent in the present invention as mentioned hereinabove are also achieved.

The above objects, features and advantages of the present invention will be clear from the following detailed description of the preferred embodiments thereof taken in conjunction with the accompanying drawings.

FIG. 1 is a perspective view showing one embodiment of multicolor recording apparatus in accordance with the present invention.

FIG. 2 is an elevated sectional view showing the original reading portion of the apparatus of FIG. 1.

Figure 3:
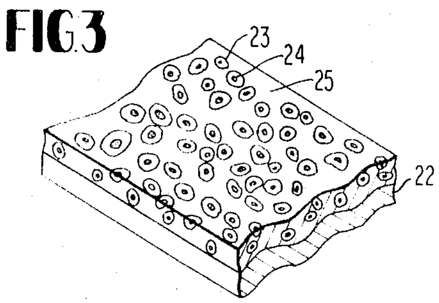
FIGS. 3 and 4 are views of photosensitive materials which may be used in the present invention.

FIG. 3 is an enlarged perspective view of a photosensitive material which presents different colors according to the intensity of light irradiated thereon.

Figure 4:
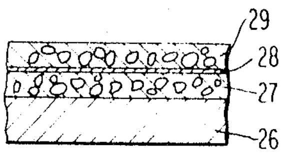

FIG. 4 is an enlarged cross sectional view of the photosensitive material used in the present invention shown in FIG. 3.

Figure 5:
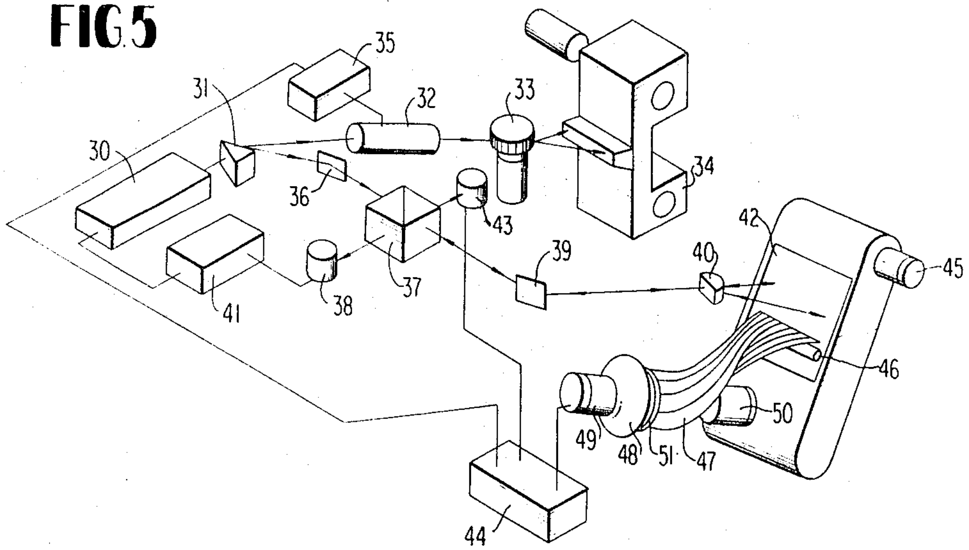

FIG. 5 is a perspective view of another embodiment of multicolor recording apparatus in accordance with the present invention.

Referring first to FIG. 1, an original reading portion 1, a laser source 2, a condenser lens system 3 and a light amplitude modulator 4 are mounted on a base plate 5 which is moved back and forth along a screw rod 7 as the screw rod 7 is rotated by a motor 6 to which the rod 7 is fixed. An original 8 and a photosensitive material 9 which yields different colors according to the intensity of light irradiated thereon (which hereafter will simply be referred to as a "color photosensitive material") are mounted on a rotatable cylinder 10 which is driven by a motor 11 through a belt 12. For purposes of exemplification, it is assumed that the original 8 has a content including the blue numerals and coordinate axes and a red pattern (curved line) as shown in FIG. 1. FIG. 2 shows one of the simplest examples of the original reading portion 1 shown in FIG. 1. When the motors 6 and 11 are driven and a part of the blue coordinate axis comes to the reading position of the original reading portion 1, the white light emitted from multicolor light source 15 illuminates the surface of the original 8 through a condenser lens 14 as shown in FIG. 2, and the light reflected from the original surface is divided into two parts by a light divider 16. One of the two divided light bundles consisting essentially of blue light which is substantially absorbed by a condenser lens 17 serving as a red filter and the other of the two divided parts is transmitted through another condenser lens 19 serving as a blue filter. Therefore, a photodetector 18 receiving light coming through the red filter 17 gives a low signal and a photodetector 20 receiving light coming through the blue filter 19 gives a high signal, i.e., a portion written with blue ink will absorb red light, and detector 18 gives a low signal whereas the blue area will give a high signal to detector 20. The signals from the photoelectric tubes or the photodetectors 18 and 20 go into a signal converter 21 and are converted to binary signals after being compared with predetermined thresholds. The threshold value will vary depending on the color of the paper, the degree of stain, ink-paper contrast, etc. Too low a threshold generates noise so detectors 18 and 20 yield a signal, while too high a threshold gives no signals. Those skilled in the art will be able to select an appropriate threshold value based on the above discussion. In this case, by appropriate selection of the threshold values, the signal from the photodetector 18 becomes 0, and the signal from the photodetector 20 becomes 1. The digital signal converted into the binary signal within the signal converter 21, shown in FIG. 1, is sent to generate an analog signal that is the driving voltage for the light amplitude modulator 4 according to a predetermined program so that the rate of modulation of the light amplitude modulator 4 may become 0 percent when the digital signal is (00), 40 percent when (01), 70 percent when (10) and 100 percent when the signal is (11). Accordingly, different colors representing different colors in the original can be recorded just by impinging a laser beam on the color photosensitive material. Since the response speed of the modulator is several MHz,. the only effective limitation posed on the speed of the digital signal is by the speed of the photosensitive material. The digital signal is usually less than 0.5$\mu$ sec., in general.

FIG. 3 shows an example of color photosensitive material in which two kinds of couplers 23 and 24 are applied on a substrate 22 together with a binder. The substrate 22 can be paper, a plastic, a glass and the like, depending on the proposed use of the recorded material. Various kinds of couplers as are known in the art can be used. One such coupler preferably used in this invention is composed of a heat fusible material, an organic acid serving as an electron accepter and a leuco coloring agent serving as an electron donor material.

Although the embodiment shown in FIG. 3 has only one photosensitive layer, the photosensitive material used in this invention may comprise a plurality of photosensitive layers. FIG. 4 shows an example of such a photosensitive material which can be used in the present invention which has three photosensitive layers wherein a photosensitive layer 27 containing a red coupler is coated on a substrate 26, an insulating layer 28 to control the amount of the incident light and facilitating coating of a photosensitive layer 29 containing a blue coupler is coated on the insulating layer 28. The insulating layer 28 may be formed of any material such as a metal, a plastic, gelatin, and so forth. Usually, a metal film of about 10 A to 500 A is used as an insulating layer, though the use of such a layer is optional.

Examples of color formers which can be used in the present invention are dinapthospiropyran (blue), 1,3,3-trimethyl-2,2,benzospiropyran (red) and the like.

Examples of color developers which can be used in the present invention are naphthyl sulfonic acid, salicylic acid, and the like.

Examples of thermofusible materials which can be used in the present invention are acetanilide (Melting point 120°–130°C.), N-ethylacetanilide (melting point 80°–100°C.), and the like.

A photosensitive material as shown in FIG. 3 can be made by covering a color former with a thermofusible material, e.g., by microencapsulation. Another color former can then be covered with another thermofusible material, i.e., microencapsulated. These capsules, a color developer and a binder such as polyvinyl alcohol can be dispersed in water, applied on a base and dried.

A photosensitive material as shown in FIG. 4 can be formed as follows.

Particles formed of a color developer and a thermofusible material and a powdered color former are applied on a base with a binder, and particles formed of another thermofusible material, a color developer and another powdered color former are superposed upon the first applied layer.

FIG. 5 shows an embodiment of the multicolor recording apparatus according to the present invention wherein the fluctuation of the laser output and the contrast of the original is detected to yield an image of good quality. The light beam emitted from a laser source 30 consisting essentially of two laser beams having wavelengths of 5,145 A and 4,880 A is dispersed through a spectroscopic prism 31, and the light beam of 5,145 A passes through a light modulator 32 and scans the photosensitive material in a camera 34 by means of a rotatable prism type light deflector 33. The light passing through the light modulator 32 is modulated by an electric signal from a light modulating driving source 35, and accordingly, an image is formed on the photosensitive material within the camera 34 when the photosensitive material moves vertically. The other light beam of 4,880 A is directed toward a reflector 36 and enters a light splitting prism 37 after being reflected by reflector 36. One of the split light portions impinges on a photodetector 38 and the other is passed to a cylindrical lens 40 by way of a reflector 39. The output electrical signal from the photodetector 38 includes information concerning the fluctuation of the amount of laser light emitted from the laser source 30, and accordingly is fed back to the source 30 through a signal converter 41 to stabilize the laser output by automatic control. Such fluctuation could be due to, for example, heat expansion of the laser resonantor, input power fluctuation, etc.

The light beam spread by cylindrical lens 40 impinges on the original 42 and a part of the light reflected thereby is collected by the cylindrical lens 40 again and returns to the light splitting prism 37 by way of reflector 39, and thereafter enters the photodetector 43 by way of the light splitting prism 37. The electric output signal from the photodetector 43 is in proportion to the reflectance of the original 42 in one dimensional direction thereof, and accordingly is used to compensate the output of the signal converter 44 which is used for reading and converting the detected color to an analog signal representing the color of the original. While light dispersed in two directions may be used, a special complicated optical system is needed to collect such light, and such is both unnecessary and undesirable in the present invention. For instance, a red paper having letters or the like written with brown ink thereon generates a small signal by the detector 43 (because of blue illumination), so that the threshold value should be lowered. On the other hand, where a light blue sheet with blue and green letters is read, a large signal is generated so a higher threshold is needed. Both operations are "compensations."

The original 42 on a belt driven by a synchronous motor 45 is illuminated by a white light source 46, and a part of the illuminated original 42 is read through an optical fiber device 47. One end of the optical fiber device 47 is formed in a line which corresponds to light source 46 and the other end thereof is formed in a cylindrical shape so that the information of the original 42 may be converted to a time series photo-signal by rotating a disc 51 (having a slit 51*a* at the end of the cylindrically shaped optical fiber device) by a motor 50 to optically open and close the respective optical fibers with the passage of slit in front of the fiber. The time series signals are collected by a condenser mirror 48 comprising a combination of spherical mirrors and received by a group of photodetectors 49 of different wavelength sensitivity and converted into time series electric signals. A signal for recording in the color representing the original can be generated by the signal converter 44 by the above described means.

In the embodiment shown in FIG. 5, a stable and clear image can be made at high speed due to the laser beam stabilizing mechanism, the signal compensating mechanism and the particular beam scanning method performed on the original and the recording material.

It will be understood that the enlargement and reduction of size of an image obtained can be easily performed, and especially a reduction recording of a fifth to a hundredth reduction ratio can be advantageously conducted utilizing the feature of laser recording by use of a concentrated laser beam.

While the invention has been described in detail and with reference to specific embodiments thereof, it will be apparent to one skilled in the art that various changes and modifications can be made therein without departing from the spirit and scope thereof.

What is claimed is:

1. Apparatus for recording multicolor images from an original comprising an original reading means for generating a signal which varies in accordance with the colors of the original, a laser source emitting a light beam of a single wavelength, a signal converter means for converting the signal from said original reading means to a signal representing the color of the original, and light amplitude modulator means coupled to said signal converter means for amplitude modulating the laser beam stepwise to one of a plurality of intensity levels in accordance with the signal supplied from said signal converter means, a recording material which yields different colors in response to the intensity of light irradiated thereon, and means for directing the amplitude modulated laser mean on said material, whereby said light beam is modulated in accordance with the colors of the original and a multicolor image is recorded on said material.

2. An apparatus for recording multicolor images as defined in claim 1 wherein said original reading means includes a multicolor light source and a plurality of photodetector means of different wavelength sensitivity.

3. An apparatus for recording multicolor images as defined in claim 1 wherein said original reading means includes a multicolor light source, a plurality of photodetector means and a plurality of different color filters located in front of said photodetector means.

4. An apparatus for recording multicolor images as defined in claim 3 wherein said color filters comprise a condenser lens and a light splitter prism means for splitting the light from said light source reflected from said original, wherein said condenser lens is positioned adjacent said light source in the path of the light.

5. A method of recording multicolor images from an original on a photosensitive material which yields different colors in accordance with the intensity of the light irradiated thereon comprising the steps of:

a. generating a color signal in accordance with the multicolor image on the original;

b. generating an amplitude modulated monochromatic laser beam wherein the modulation is a function of the color signal; and c. irradiating the photosensitive material with the amplitude modulated laser beam to produce a color image on said photosensitive material wherein the color of the produced image is a function of the amplitude of the laser beam.

6. The method defined in claim 5 wherein the step of generating a color signal comprises:

a. irradiating the original with a multicolor light source; and b. separately detecting the individual colors, from said multicolor light source, reflected by said original.

* * * * *